US006659210B2

(12) United States Patent
Tyson

(10) Patent No.: US 6,659,210 B2
(45) Date of Patent: Dec. 9, 2003

(54) GOLF ATTACHMENT, AND DEVICE PROVIDED THEREWITH

(76) Inventor: Albert Ronald Tyson, 8511 Bowness Rd, NW, Calgary (CA), T33 OH8

( * ) Notice: Subject to any disclaimer, the term of this patent is extended or adjusted under 35 U.S.C. 154(b) by 88 days.

(21) Appl. No.: 09/832,961

(22) Filed: Apr. 12, 2001

(65) Prior Publication Data

US 2002/0148657 A1 Oct. 17, 2002

(51) Int. Cl.$^7$ .............................. B60K 1/00; B62M 1/00
(52) U.S. Cl. ................. 180/65.1; 280/87.041; 280/47.26; 280/DIG. 5; 280/DIG. 6
(58) Field of Search ................. 180/65.1, 180, 180/181, 908, 68.5; 280/87.01, 87.041, 47.17, 47.2, 47.24, 47.26, 79.2, DIG. 5, DIG. 6

(56) References Cited

U.S. PATENT DOCUMENTS

| | | | | |
|---|---|---|---|---|
| D68,191 S | * | 9/1925 | Clisby ..................... | D21/423 |
| 3,043,389 A | * | 7/1962 | Steinberg ................. | 180/208 |
| 3,247,923 A | * | 4/1966 | Cornell .................... | 180/19.1 |
| 3,485,314 A | * | 12/1969 | Herr ......................... | 180/19.1 |
| 4,615,406 A | * | 10/1986 | Bottenschein et al. .... | 180/19.1 |
| 4,848,504 A | * | 7/1989 | Olson ....................... | 180/19.1 |
| 4,874,055 A | * | 10/1989 | Beer ........................ | 180/19.2 |
| 5,161,635 A | * | 11/1992 | Kiffe ........................ | 180/19.3 |
| 5,562,176 A | * | 10/1996 | Lucernoni et al. ........ | 180/180 |
| 5,839,528 A | * | 11/1998 | Lee .......................... | 180/11 |
| 6,139,032 A | * | 10/2000 | Hartman .................. | 180/15 |
| 6,152,465 A | * | 11/2000 | Shieh ....................... | 280/62 |
| 6,283,238 B1 | * | 9/2001 | Royer et al. ............. | 180/19.1 |
| 6,409,188 B1 | * | 6/2002 | Hesmer ................... | 248/96 |
| 6,474,427 B1 | * | 11/2002 | Tunnecliff ............... | 180/19.1 |
| 2002/0074176 A1 | * | 6/2002 | Justus et al. ............ | 180/181 |

* cited by examiner

Primary Examiner—Paul N. Dickson
Assistant Examiner—Laura B. Rosenberg
(74) Attorney, Agent, or Firm—I. Zborovsky

(57) ABSTRACT

A device for golfing has a golf caddy having one pair of wheels and an inclined holding bar, and an attachment having a substantially horizontal platform with two opposite ends spaced from one another in a horizontal direction, another pair of wheels located at one end of the platform, and electric motor drive means connected with the first pair of wheels so as to drive the first pair of wheels and therefore to move the platform, and means for connecting the platform with the one pair of wheels of the golf caddy so that in one position the platform is connected with the one pair of wheels of the golf caddy at one side of the one pair of wheels so that the holding bar extends at an acute angle to the platform and a user can stand on the platform and ride, and another position in which the platform is connected with the one pair of wheels of the golf caddy and the holding bar extends at an obtuse angle to the platform so that a user can pull the device.

16 Claims, 4 Drawing Sheets

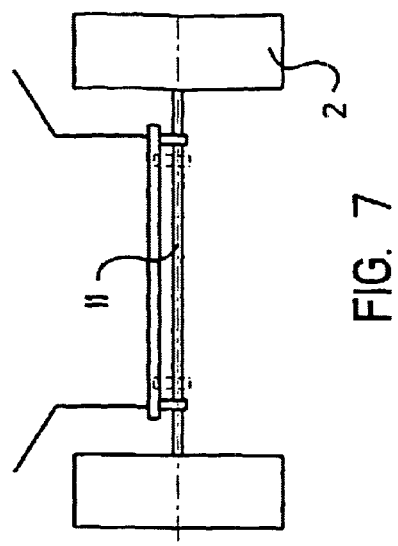
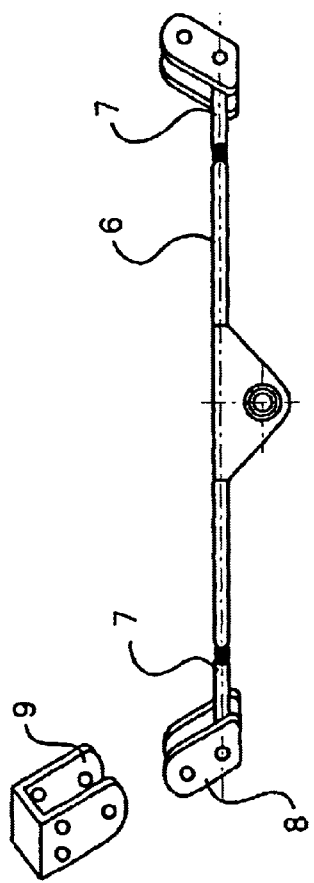

GOLF ATTACHMENT, AND DEVICE PROVIDED THEREWITH

SUMMARY OF THE INVENTION

Accordingly, it is an object of the present invention to provide an attachment to a golf caddy, and a device provided therewith.

In keeping with these objects and with others which will become apparent hereinafter, one feature of the present invention resides, briefly stated, in an attachment to a golf caddy having a pair of wheels, which comprises a platform with electric motor drive means and another pair of wheels and connectable to the golf caddy alternatingly at opposite side of the holding bar, for either riding the device or pulling the device with or without assistance of the drive. A device which has a substantially horizontal platform having two opposite ends spaced from one another in a horizontal direction; a first pair of wheels located at one end of said platform; a second pair of wheels located at the other end of said platform; electric motor drive means connected with said first pair of wheels so as to drive said first pair of wheels and therefore to move said platform; an inclined upwardly extending holding bar arranged to be held by a user; and means for connecting said platform with said second pair of wheels so that in one position said platform is connected with said second pair of wheels at one side of said second pair of wheels so that said holding bar extends at an acute angle to said platform and a user can stand on the platform and ride the device, and another position in which said platform is connected with said second pair of wheels at an opposite side of said second pair of wheels and said holding bar extends at an obtuse angle to said platform so that a user can pull the device.

When the attachment and the device are designed in accordance with the present invention, then in a first position, a golfer can ride on the device powered by an electric motor drive, while in the second position the golfer can pull the device manually or pull the device with additional use of the power of the electric motor drive. The device can be also stored in a vehicle trunk. It can be easily charged in the trunk by plugging to an electrical system of the vehicle.

In accordance with another important feature of the present invention, the device has a streamline casing arranged on a platform and narrowing forwardly, or in particular in direction of riding the device. When a driver rides the device in the first position with a substantially high speed, the streamline configuration of the casing reduces a resistance to riding.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 5 is a view of a front axle of the device in accordance with the present invention;

FIG. 6 shows a detail of a connection of the front axle to the wheels of the inventive device; and FIG. 7 is a rear view of the wheels of the inventive device.

DESCRIPTION OF THE PREFERRED EMBODIMENTS

Figure 1:
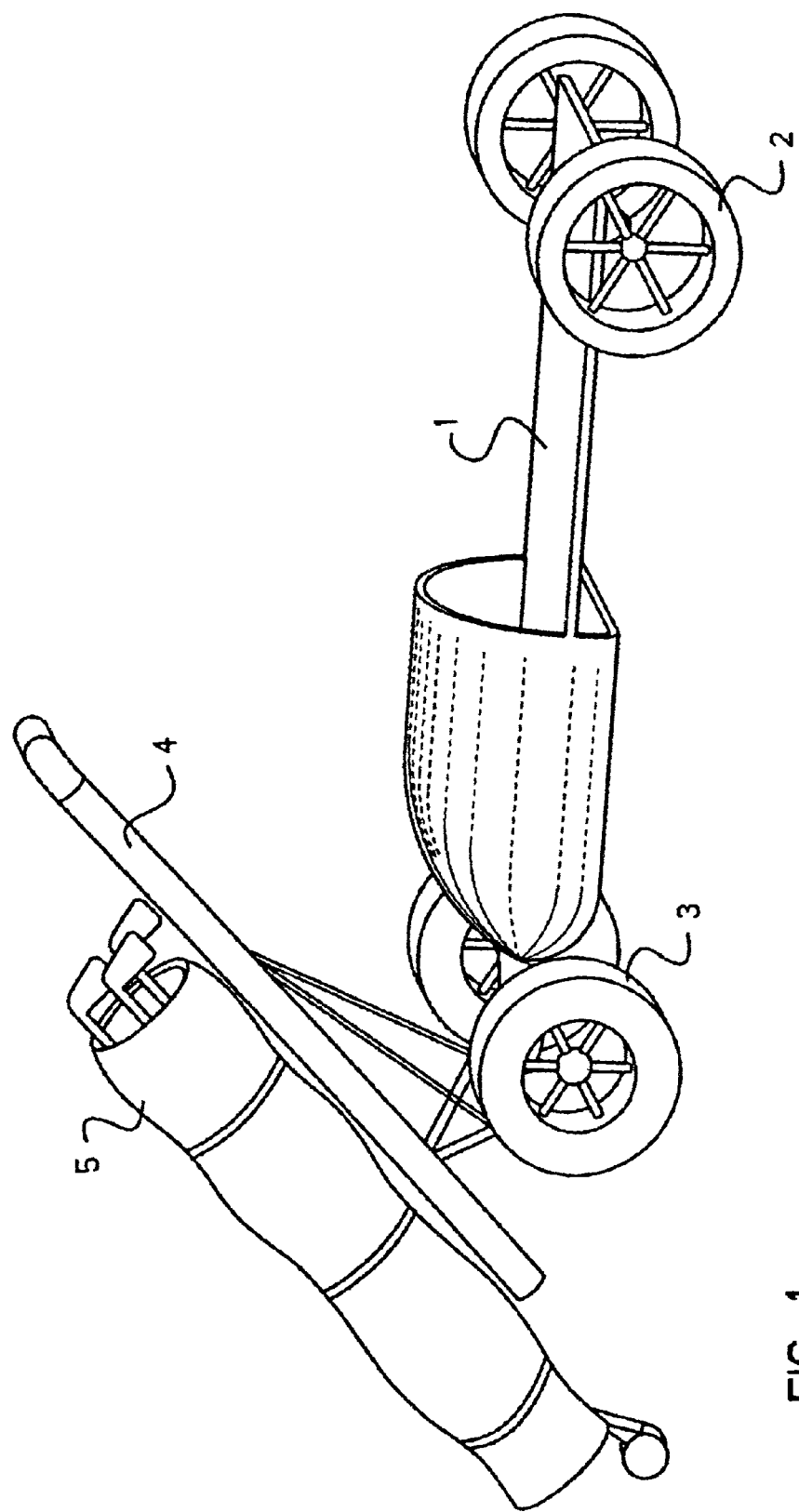
FIG. 1 is a view showing a device in accordance with the present invention in a first position, in which a golfer can ride on the device.

An attachment in accordance with the present invention has a substantially horizontal platform which is identified with reference numeral 1 and has a front end and a rear end. At the rear end shown in FIG. 1 two wheels 2 are turnably connected with the rear end of the platform 1 and are driven as will be explained herein below. The attachment is attached to a golf caddy which has two front wheels 3 are turnably connected with a caddy frame. The golf caddy is further has an inclined bar 4 so that a golfer, can hold the bar 4. A case 5 for golf clubs is attached to the golf caddy, for example to the bar 4.

The device which includes the attachment and the golf caddy in accordance with the present invention is convertible between two positions. In one position shown in FIG. 1 the platform is located at one side of the inclined bar 4, so that the inclined bar 4 includes an acute angle with the platform 1. In this position, a golfer stands on the platform 1 and holds the bar 4, so that the golfer can ride on the device under the action of an electric motor drive which rotates the rear wheels 2. In another position shown in FIG. 2, the platform 1 is located at the opposite side of the bar 4, so that the bar 4 includes an obtuse angle with the platform 1, and a golfer can pull the device to the right in FIG. 2 by holding the bar 4. The pulling can be performed manually or also with assistance of the electric motor drive.

The front wheels 3 of the golf caddy are arranged on a front axle 6. The front axle 6 has a central portion and two end portions 7 connected with one another by threads so as to adjust the width between the wheels. The ends of the end portion 7 are connected with brackets 8 for side-to side movement, which in turn are connected to brackets 9 mounted on the platform. A quick release pin 10 can disengage the connection between the brackets.

Figure 2:
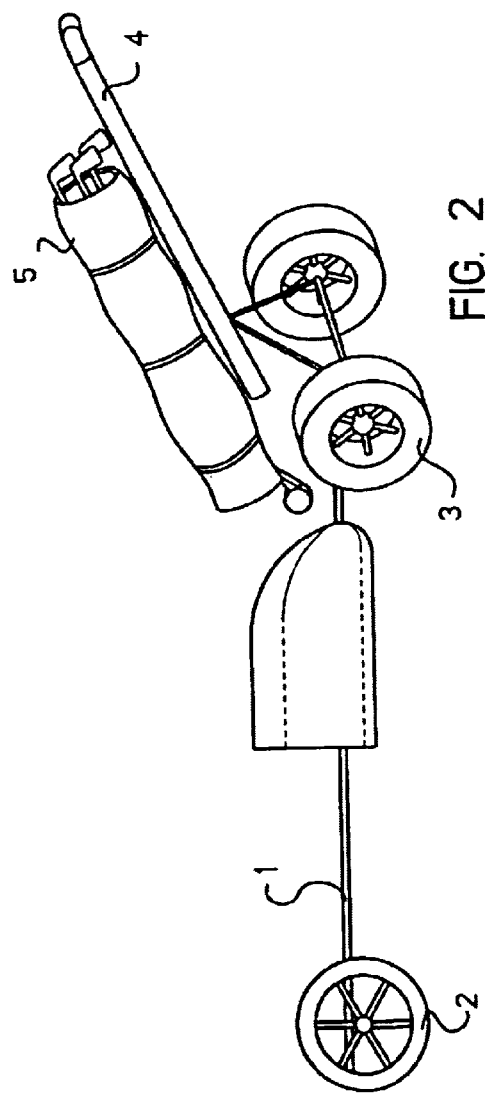
FIG. 2 is a view showing an inventive device in a second position in which the golfer pulls the device.
Figure 3:
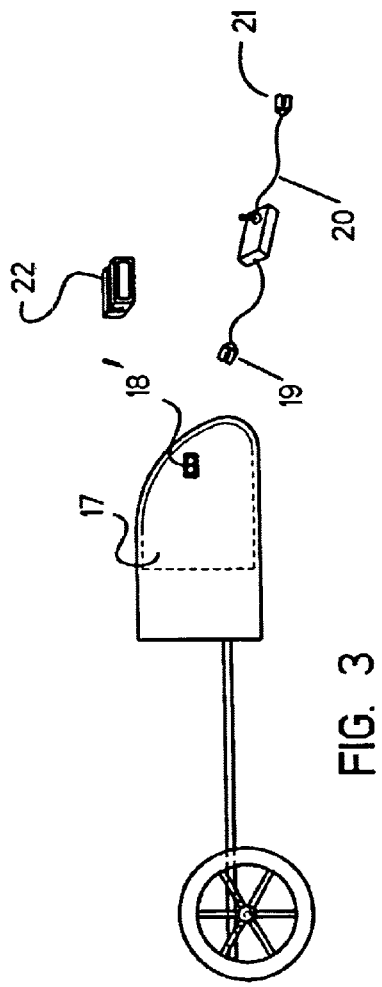
FIG. 3 is a view illustrating a charging of a battery of a drive unit of the inventive device.
Figure 4:
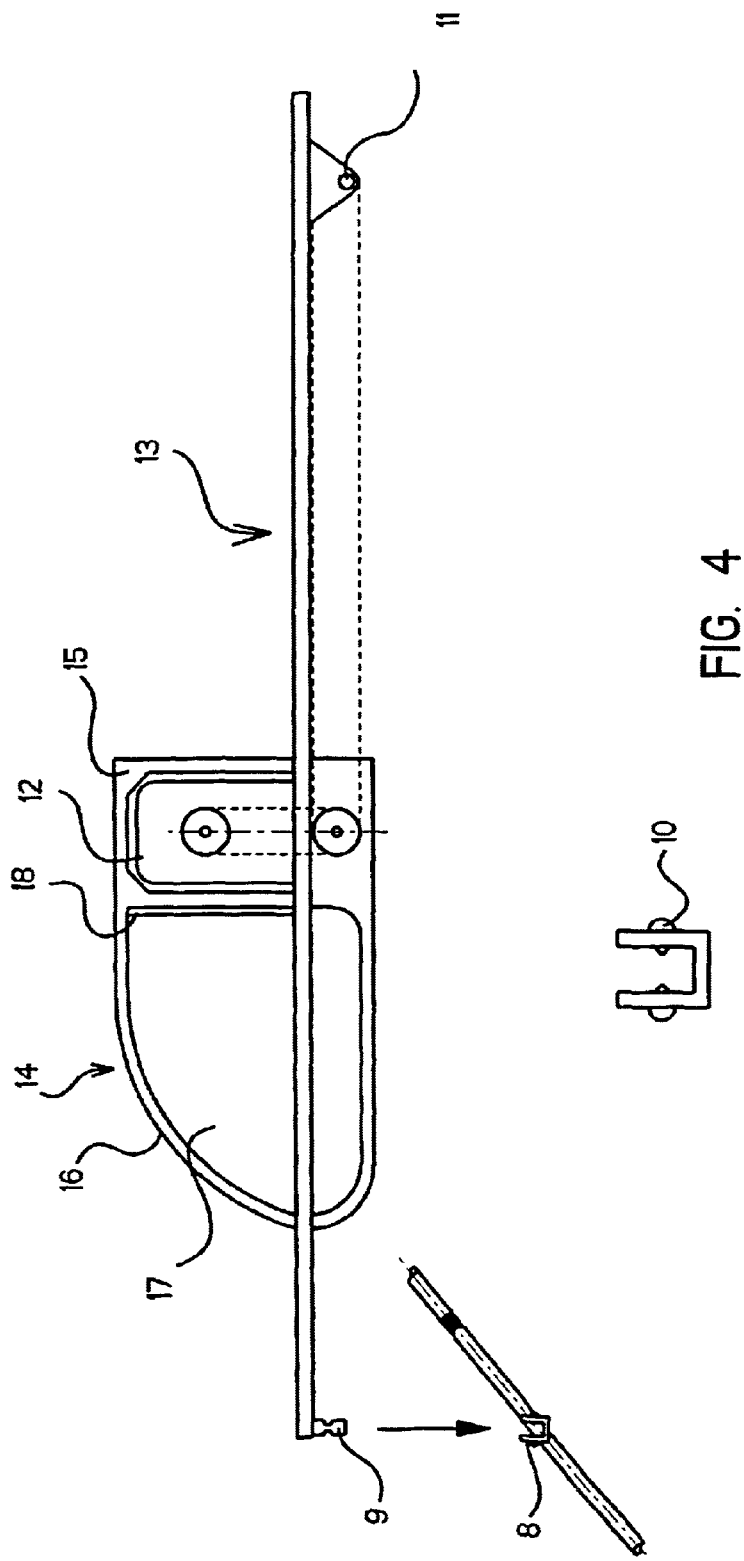
FIG. 4 is a view schematically showing a method of connecting and disconnecting of a platform of the inventive device.

In order to convert the device from the riding position shown in FIG. 1 to the pulling position shown in FIG. 2, the brackets 8 are pressed to release the pins 10, and the brackets 9 are disconnected from the brackets 8. The platform is turned in a horizontal plane 180°, and the brackets 9 are again engaged with the brackets 8 and connected with them by the pins 10.

The rear wheels 2 are arranged on an axle 11 which is drivingly connected with an electric motor 12 for example through a belt transmission 13. The belt transmission 13 includes a pulley arranged on an output shaft of the electric motor 12, a second pulley arranged below the platform and connected by a belt with the first mentioned pulley, and a third pulley arranged on the axle 11 and connected to the second pulley by a belt. Thereby, during rotation of the output shaft of the electric motor 12, its rotation is transmitted to the axle 11 of the rear wheels 2 and therefore to the rear wheels.

The attachment is further provided with a casing which is identified as a whole with reference numeral 14. It includes a rear part 15 which has a substantially uniform height and accommodates the electric motor 12, and a front portion 16 which has a height reducing from the rear part 15 forwardly and downwardly to the platform 1. As a result the casing 14 has a streamline configuration, so that during riding on the device with a substantially high speed, a resistance to the riding is reduced. A battery 17 is accommodated in the part 16 of the casing 14.

A protective shield 18 for example of an insulating material is located between the electric motor 12 and the battery 17.

The power source, for example a battery 17 is rechargeable. For this purpose it has a plug means 18' engageable with exterior plug means 19 provided on an electric cable 20, whose opposite end 21 is pluggable into an electric source, for example an electric system of a vehicle which carries the device in a folded position in its trunk. A removable collapsible rubber washer 22 which can have a cup shape is fittable onto the plug means 18' after the plug means 19 is disconnected from it.

It is to be understood that the device is provided with a switch for turning on and turning off of the electric motor. The electric motor can be of adjustable power, and the switch can have individual positions. For example, in one position the switch turns off the motor completely. In another position the switch turns the electric motor to provide a greater power for riding on the golf cart. In a further position, the switch turns motor to a lower power, so that when the user pulls the golf cart, the electric motor assists the golfer.

It will be understood that each of the elements described above, or two or more together, may also find a useful application in other types of constructions differing from the types described above.

While the invention has been illustrated and described as embodied in golf cart, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

What is claimed is:

1. An attachment for a golf caddy having a first pair of wheels and an inclined holding bar, the attachment comprising a substantially horizontal platform on which a user can stand for riding and having two opposite ends spaced from one another in a horizontal direction; a second pair of wheels located at one end of said platform; electric motor drive means connected with said second pair of wheels so as to drive said second pair of wheels and therefore to move said platform; and means for connecting said platform with said first pair of wheels of the golf caddy at one side of said first pair of wheels so that said holding bar extends at an acute angle to said platform and a user can stand on the platform and ride, and another position in which said platform is connected with said first pair of wheels of the golf caddy at an opposite side of said first pair of wheels of the golf caddy and said holding bar extends at an obtuse angle to said platform so that a user can pull the attachment with the golf caddy.

2. An attachment as defined in claim 1, wherein said first pair of wheels has an axle, said connecting means being operative for connecting said platform with and disconnecting said platform from said axle at said one side and at said opposite side of said first pair of wheels.

3. An attachment as defined in claim 1; and further comprising a housing mounted on said platform and accommodating said electric motor drive means, said housing has width which reduces in a direction from said second pair of wheels toward said first pair of wheels, to reduce resistance to driving when the user rides on the platform in said first position.

4. An attachment as defined in claim 1; and further comprising means for transmitting a rotation of said electric motor drive means to said first pair of wheels so as to drivingly rotate the latter.

5. An attachment as defined in claim 1, wherein said electric motor drive means includes an electric motor, and an electric power source connected with said electric motor, so that said electric motor can obtain power from said electric power source.

6. An attachment as defined in claim 5, wherein said electric power source is rechargeable; and further comprising means for recharging said electric power source.

7. An attachment as defined in claim 5; and further comprising a protective shield provided between said electric motor and said electric power source.

8. A device for golfing, comprising a golf caddy having a first pair of wheels and an inclined holding bar; and an attachment having a substantially horizontal platform on which a user can stand for riding and which has two opposite ends spaced from one another in a horizontal direction, a second pair of wheels located at one end of said platform, and electric motor drive means connected with said second pair of wheels so as to drive said second pair of wheels and therefore to move said platform; and means for connecting said platform with said first pair of wheels of said golf caddy so that in one position said platform is connected with said first pair of wheels of said golf caddy at one side of said first pair of wheels so that said holding bar extends at an acute angle to said platform and a user can stand on the platform and ride, and another position in which said platform is connected with said first pair of wheels of said golf caddy at an opposite side of said first pair of wheels and said holding bar extends at an obtuse angle to said platform so that a user can pull the device.

9. A device as defined in claim 8, wherein said first pair of wheels has an axle, said connecting means being operative for connecting said platform with and disconnecting said platform from said axle at said one side and at said opposite side of said first pair of wheels.

10. A device as defined in claim 8, and further comprising a housing mounted on said platform and accommodating said electric motor drive means, said housing has width which reduces in a direction from said second pair of wheels toward said first pair of wheels, to reduce resistence to driving when the user rides on the platform in said first position.

11. A device as defined in claim 8; and further comprising means for transmitting a rotation of said electric motor drive means to said first pair of wheels so as to drivingly rotate the latter.

12. A device as defined in claim 8, wherein said electric motor drive means includes an electric motor, and an electric power source connected with said electric motor, so that said electric motor can obtain power from said electric power source.

13. A device as defined in claim 12, wherein said electric power source is rechargeable; and further comprising means for recharging said electric power source.

14. A device as defined in claim 12; and further comprising a protective shield provided between said electric motor and said electric power source.

15. An attachment for a golf caddy having a first pair of wheels and an inclined holding bar, the attachment comprising a substantially horizontal platform on which a user can stand for riding and having two opposite ends spaced from one another in a horizontal direction; a second pair of wheels located at one end of said platform; electric motor drive means connected with said second pair of wheels so as to drive said second pair of wheels and therefore to move said platform; and means for connecting said platform with said first pair of wheels of the golf caddy so that in one position said platform is connected with said first pair of wheels of the golf caddy at one side of said first pair of wheels so that said holding bar extends at an acute angle to said platform and a user can stand on the platform and ride, and another position in which said platform is connected with said first pair of wheels of the golf caddy at an opposite side of said first pair of wheels of the golf caddy and said holding bar extends at an obtuse angle to said platform so that a user can pull the attachment with the golf caddy, said electric motor drive means including an electric motor and an electric power source connected with said electric motor, so that said electric motor can obtain power from said electric power source; and a housing arranged on said platform, said electric motor and said electric power source being arranged in said housing, said housing having a first part with a first height and a second part with a height reducing from said first part toward said platform, said electric motor being located in said first part of said housing, while said electric power source is located in said second part of said housing.

16. A device for golfing, comprising a golf caddy having a first pair of wheels and an inclined holding bar; and an attachment having a substantially horizontal platform on which a user can stand for riding and which has two opposite ends spaced from one another in a horizontal direction, a second pair of wheels located at one end of said platform, and electric motor drive means connected with said second pair of wheels so as to drive said second pair of wheels and therefore to move said platform; and means for connecting said platform with said first pair of wheels of said golf caddy so that in one position said platform is connected with said pair of wheels of said golf caddy at one side of said first pair of wheels so that said holding bar extends at an acute angle to said platform and a user can stand on the platform and ride, and another position in which said platform is connected with said first pair of wheels of said golf caddy at an opposite side of said first pair of wheels and said holding bar extends at an obtuse angle to said platform so that a user can pull the device, said electric motor drive means including an electric motor, and an electric power source connected with said electric motor, so that said electric motor can obtain power from said electric power source; and a housing arranged on said platform, said electric motor and said electric power source being arranged in said housing, said housing having a first part with a first height and a second part with a height reducing from said first part toward said platform, said electric motor being located in said first part of said housing, while said electric power source is located in said second part of said housing.

\* \* \* \* \*